US007210415B2

(12) United States Patent
Brunson

(10) Patent No.: US 7,210,415 B2
(45) Date of Patent: May 1, 2007

(54) MITER SAW WITH WEAR PLATES AND ORIENTATION SYSTEM THEREFOR

(75) Inventor: Mark E. Brunson, Abingdon, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 11/288,457

(22) Filed: Nov. 29, 2005

(65) Prior Publication Data
US 2006/0075866 A1 Apr. 13, 2006

Related U.S. Application Data

(62) Division of application No. 10/273,724, filed on Oct. 18, 2002, now Pat. No. 7,013,780, which is a division of application No. 08/761,035, filed on Dec. 5, 1996, now Pat. No. 6,474,206.

(60) Provisional application No. 60/008,516, filed on Dec. 12, 1995.

(51) Int. Cl.
B23Q 1/26 (2006.01)
A47B 11/00 (2006.01)
B23D 45/14 (2006.01)
B27B 5/20 (2006.01)

(52) U.S. Cl. .............. 108/104; 108/142; 83/471.3; 83/473; 83/477; 83/581; 269/68; 409/224

(58) Field of Classification Search ............. 83/471.3, 83/472, 473, 477, 477.1, 486, 486.1, 487–490, 83/581; 108/103, 104, 139, 142; 409/224; 269/68, 289 R, 290, 291
See application file for complete search history.

(56) References Cited

U.S. PATENT DOCUMENTS

| 1,923,820 | A |   | 8/1933  | Gorton              |
|-----------|---|---|---------|---------------------|
| 2,205,019 | A | * | 6/1940  | Parsons ..... 269/127 |
| 2,495,250 | A | * | 1/1950  | Gilly ........... 108/3 |
| 2,666,367 | A |   | 1/1954  | Berthiez            |
| 3,487,863 | A |   | 1/1970  | Buckley             |
| 3,574,315 | A |   | 4/1971  | Boultinghouse       |
| 3,611,953 | A |   | 10/1971 | Schottl             |
| 3,821,918 | A |   | 7/1974  | Niehaus et al.      |
| 3,948,136 | A |   | 4/1976  | Gutowski et al.     |
| 3,998,121 | A |   | 12/1976 | Bennett             |
| 4,011,782 | A |   | 3/1977  | Clark et al.        |
| 4,152,961 | A |   | 5/1979  | Batson              |
| 4,452,117 | A |   | 6/1984  | Brickner et al.     |
| 4,453,576 | A |   | 6/1984  | Burns               |
| 4,537,105 | A |   | 8/1985  | Bergler             |
| 4,559,857 | A |   | 12/1985 | Grossmann et al.    |
| 4,665,782 | A |   | 5/1987  | Vander Pol          |
| 4,934,233 | A |   | 6/1990  | Brundage et al.     |
| 5,042,348 | A |   | 8/1991  | Brundage et al.     |
| 5,046,390 | A |   | 9/1991  | Sasaki              |
| 5,216,964 | A |   | 6/1993  | Sato et al.         |

(Continued)

Primary Examiner—Clark F. Dexter
(74) Attorney, Agent, or Firm—Harness, Dickey & Pierce, P.L.C.

(57) ABSTRACT

A device has a base which supports a rotatable table. The device includes a three position locking system. The first position locks the table to the base, the second position releasably locks the table to the base and the third position permits free rotation of the table on the base. A lever assembly, a locking rod and a locking spring function together to provide for the three positions.

16 Claims, 6 Drawing Sheets

U.S. PATENT DOCUMENTS

| | | |
|---|---|---|
| 5,235,889 A | 8/1993 | Brickner et al. |
| 5,249,496 A | 10/1993 | Hirsch et al. |
| 5,347,902 A | 9/1994 | Brickner et al. |
| 5,560,273 A | 10/1996 | Keddie |
| 5,595,124 A | 1/1997 | Wixey et al. |
| 5,819,624 A | 10/1998 | Brault et al. |
| 5,823,085 A | 10/1998 | Kondo et al. |
| 5,862,732 A | 1/1999 | Itzov |
| 5,870,939 A * | 2/1999 | Matsubara ............. 83/471.3 |
| 5,937,720 A | 8/1999 | Itzov |
| 5,988,031 A | 11/1999 | Wixey |
| 6,016,732 A * | 1/2000 | Brault et al. .......... 83/471.3 |
| 7,013,780 B2 * | 3/2006 | Brunson ............... 83/471.3 |

* cited by examiner

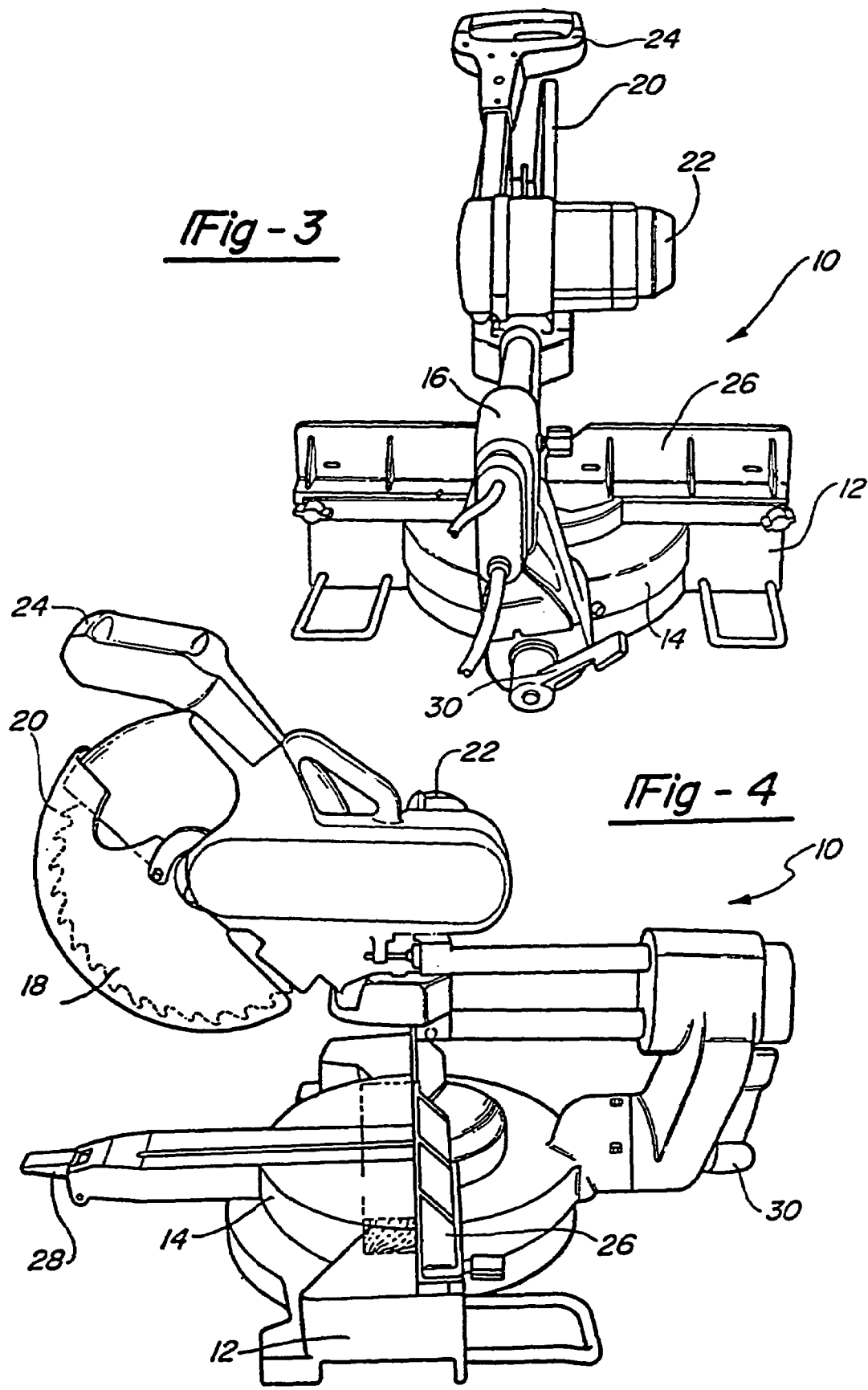

MITER SAW WITH WEAR PLATES AND ORIENTATION SYSTEM THEREFOR

CROSS-REFERENCE TO RELATED APPLICATIONS

This application is a divisional of U.S. patent application Ser. No. 10/273,724 filed on Oct. 18, 2002 now U.S. Pat. No. 7,013,780 which is a divisional of U.S. patent application Ser. No. 08/761,035 filed on Dec. 5, 1996, now U.S. Pat. No. 6,474,206 issued on Nov. 5, 2002, which is a non-provisional application of 60/008,516 filed on Dec. 12, 1995. The disclosure of the above applications are incorporated herein by reference.

FIELD OF THE INVENTION

The present invention relates to compound miter saws or other power operated equipment or machinery utilizing a cutter for performing working operations on a workpiece. More particularly, the present invention relates to improvements in the table assembly for the miter adjustment for such power operated equipment. The table assembly includes a three position locking mechanism and a set of orientated wear plates.

BACKGROUND OF THE INVENTION

Saws and other apparatuses designed for cutting or performing other working operations on a workpiece typically require adjustment mechanisms for moving the saw blade or cutting tool into an angular relationship to the workpiece. Examples of such equipment include cross-cut compound miter saws which are adapted for allowing the user to selectively move the saw blade into any of a number of positions or modes for square cutting, miter cutting, bevel cutting, or compound miter cutting where a combination miter and bevel are cut. In addition, some operations, such as dado cutting or shaping operations, for example, require the use of saw blades or other cutting or working devices of different shapes or sizes to be substituted for one another in order to perform the desired operation on the workpiece, whether the workpiece is composed of wood, plastic, metal or other materials.

In order to allow for the adjustment in miter and bevel angles, the saw blade, cutter or other working device is angularly adjustable with respect to a horizontal base and a vertical fence against which the workpiece is positioned. The miter adjustment allows the saw blade, cutter or other working device to move angularly with respect to the vertical fence while maintaining perpendicularity with the horizontal base. The bevel adjustment allows the saw blade, cutter or other working device to move angularly with respect to the horizontal base while maintaining perpendicularity with the vertical fence. At times it may be desirable to cut a combination miter and bevel by simultaneously adjusting the angularity of the blade with respect to both the horizontal base and the vertical fence.

Once the saw blade, cutter or other working device has been adjusted to the desired position with respect to the horizontal base and the vertical fence, locking mechanisms for the miter and bevel adjustment must be activated in order to prohibit movement of the saw blade, cutter or other working device with respect to the base and fence while the cutting operation is performed. These locking mechanisms need to be easily activated, adjustable and quick acting in order to optimize the efficiency of the cutting apparatus and provide convenience to the operator of the apparatus.

SUMMARY OF THE INVENTION

In accordance with the present invention, an improved table assembly incorporating a miter locking mechanism is employed. The locking mechanism includes an axially extending rod which has a three positional lever assembly at one end and a rod spring at the opposite end. The rod spring is utilized to engage a series of detents arranged at the various popular miter angles as well as locking the table at the desired miter angle. The lever assembly is movable between a first position where the miter table is locked at a specified position, a second position where the miter table is releasably held by the detents at one of the various popular miter angles and a third position where the detents are by-passed, thus allowing for adjustment of the table to a position in between miter detents. In addition to the improved miter locking mechanism, the present invention includes a unique set of wear plates disposed between the table assembly and its supporting base. The wear plates incorporate features which ensure their correct orientation during assembly of the miter saw.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 3 is a rear elevational view of the sliding compound miter saw shown in FIGS. 1 and 2;

FIG. 4 is a side elevational view of the sliding compound miter saw shown in FIGS. 1 through 3;

DETAILED DESCRIPTION OF THE PREFERRED EMBODIMENTS

Figure 1:
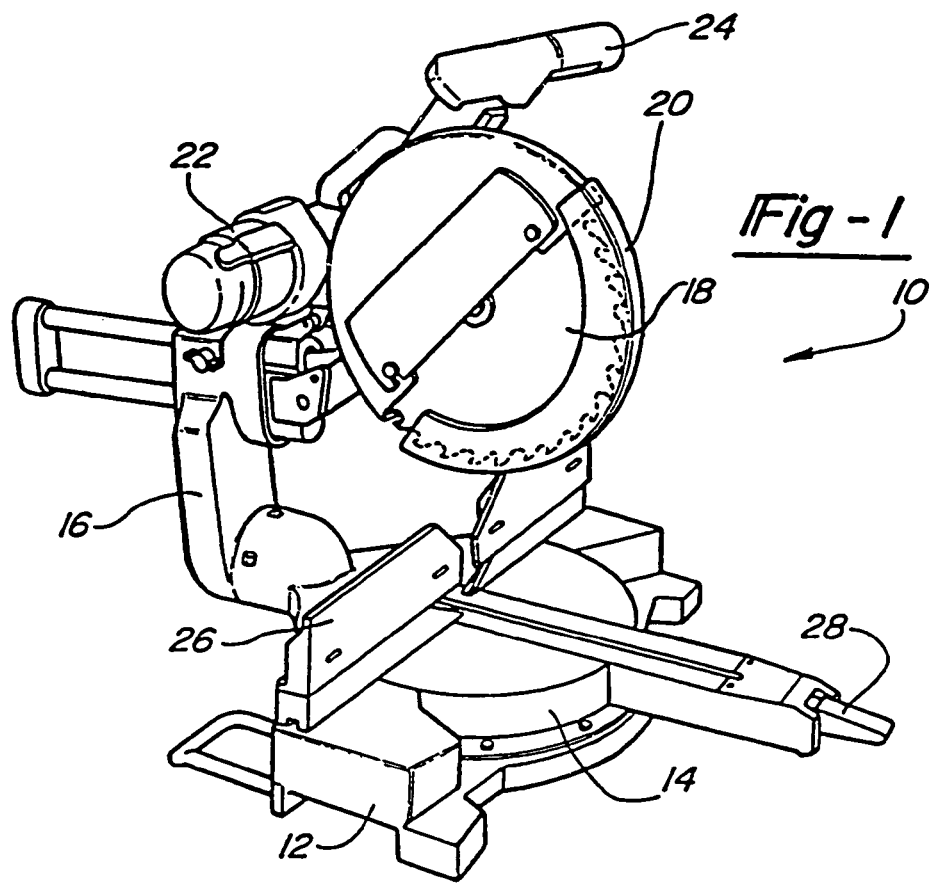
FIG. 1 is a front perspective view of a sliding compound miter saw in accordance with the present invention.
Figure 2:
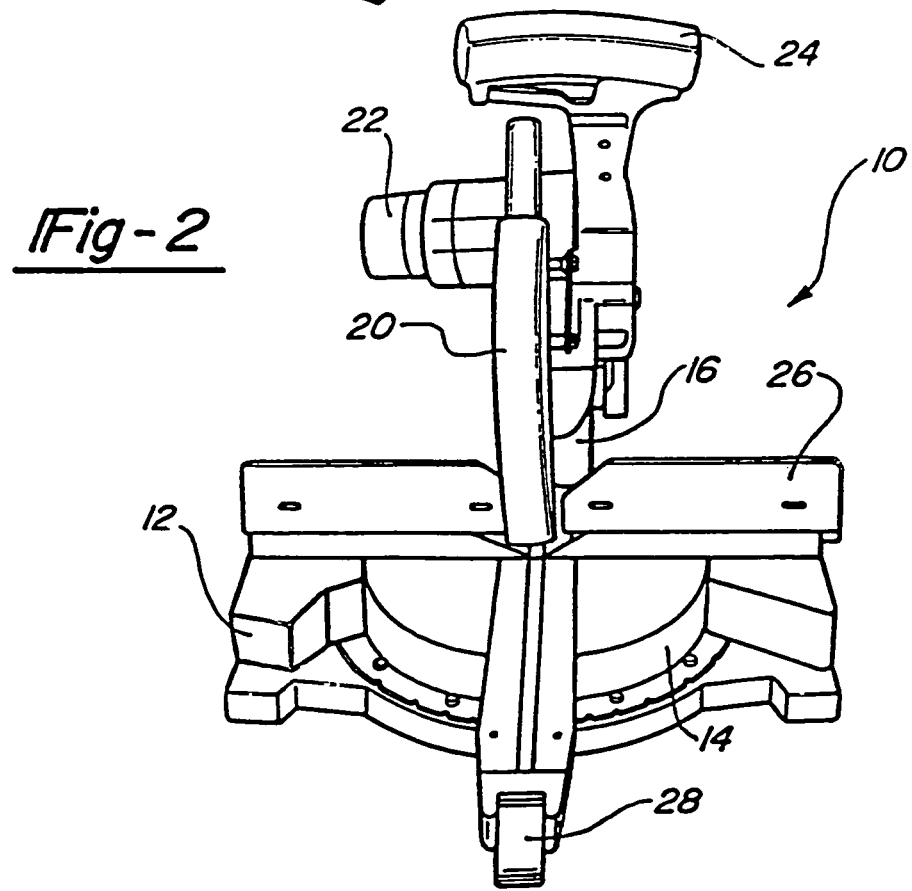
FIG. 2 is a front elevational view of the sliding compound miter saw shown in FIG. 1.

Referring now to the drawings in which like reference numerals designate like or corresponding parts throughout the several views, there is shown in FIGS. 1 through 4 an exemplary sliding compound miter saw incorporating a table assembly in accordance with the present invention, shown merely for the purposes of illustration, and designated generally by the reference numeral 10. One skilled in the art will readily recognize from the following description, taken in conjunction with the accompanying drawings and claims, that the principles of the present invention are equally applicable to sliding compound miter saws, compound miter saws, chop saws, radial arm saws, table saws or other saws of types other than that shown for purposes of illustration in the drawings. Similarly, one skilled in the art will readily recognize that the principles of the table assembly according to the present invention are also applicable to other types of powered or unpowered equipment for performing an operation on a workpiece. Such equipment includes, but is not limited to, dado saws, spindle shapers or sanders, or other types of powered or unpowered devices that would benefit from the table assembly of the present invention.

Referring primarily to FIGS. 1 through 4, sliding compound miter saw 10 comprises a base assembly 12, a table assembly 14, a housing assembly 16, a saw blade 18, a blade guard 20, a motor 22 drivingly connected to saw blade 18, a handle 24 and a fence assembly 26. Table assembly 14 is secured to base assembly 12 such that it can be rotated in order to provide adjustment for miter cutting. The rotation of table assembly 14 changes the angle of saw blade 18 relative to fence assembly 26 but maintains the perpendicularity of saw blade 18 with table assembly 14. A locking mechanism 28 can be activated in order to lock table assembly 14 to base assembly 12.

Housing assembly 16 is secured to table assembly 14 such that it can be pivoted with respect to table assembly 14 in order to provide adjustment for bevel cutting. As can be appreciated by one skilled in the art, the adjustments for mitering and beveling can be separate or they can be adjusted simultaneously in order to provide a compound miter and bevel cut. The pivoting of housing assembly 16 changes the angle of saw blade 18 relative to table assembly 14 but maintains the perpendicularity of saw blade 18 with fence assembly 26. A locking mechanism 30 can be activated in order to lock housing assembly 16 to table assembly 14.

Figure 5:
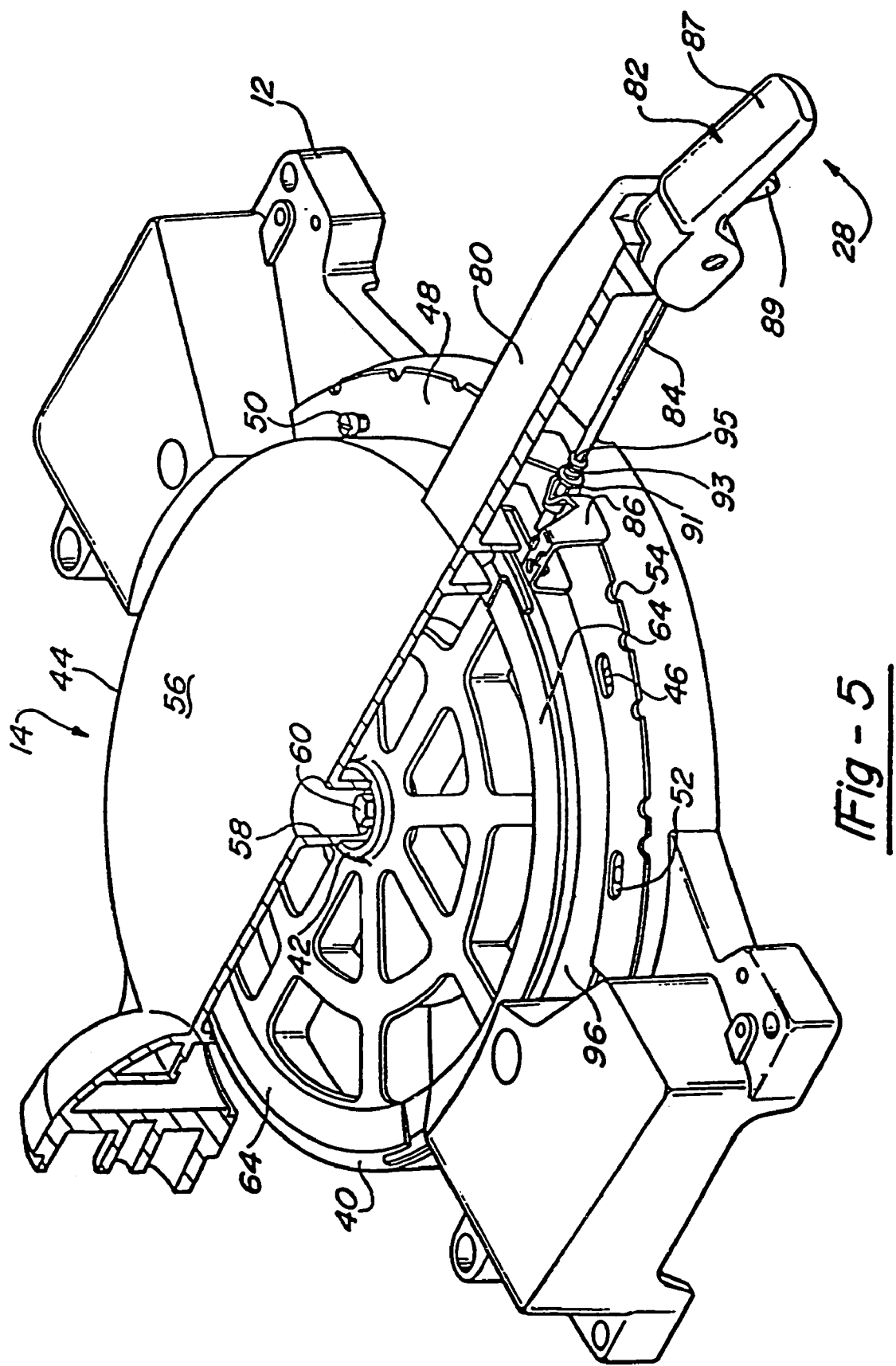
FIG. 5 is an assembled perspective view, partially in cross-section of the table assembly shown in FIGS. 1 through 4.

Referring to FIG. 5, the present invention is directed towards table assembly 14 and locking mechanism 28 which locks table assembly 14 to base assembly 12 at any specified miter angle. Base assembly 12 defines a circular mounting structure 40 which includes a cylindrical cup shaped mounting boss 42 for mounting a table 44 as will be described later herein. Base assembly 12 also defines a plurality of threaded apertures 46 which are used to mount a detent plate 48 using a plurality of bolts 50, only one being shown in FIG. 5. Detent plate 48 defines a plurality of slots 52 which correspond to the plurality of threaded apertures 46 in order to allow for the securing of detent plate 48 to base assembly 12 by bolts 50. The plurality of slots 52 permit adjustment of detent plate 48 to ensure the proper relationship of the pre-specified miter angles. Detent plate 48 further defines a plurality of detents 54 which are located at various popular miter angles for saw 10. Detents 54 work in conjunction with locking mechanism 28 to locate table 44 at one of the various popular miter angles as will be described later herein.

Table assembly 14 includes table 44 and locking mechanism 28. Table 44 is a circular plate-like member defining a work supporting surface 56 and a mounting boss 58. Table 44 is rotatably mounted to base assembly 12 by inserting boss 58 of table 44 into boss 42 of base assembly 12. A bolt 60 is inserted through table 44 and threadably received within a threaded bore 62 (FIG. 7) in base assembly 12 to complete the assembly. Bolt 60 is tightened enough to secure table 44 to base assembly 12 but it is not tightened to the point of restricting rotation of table 44 with respect to base assembly 12. The threads on bolt 60 incorporate a patch lock to lock bolt 60 in position once it has been tightened.

Table 44 rotates with respect to base assembly 12 in order to change the miter angle of saw 10. This rotation of table 44 changes the angular relationship of saw blade 18 with respect to fence assembly 26 but does not change the angular relationship of saw blade 18 with respect to table 44. Disposed between table 44 and base assembly 12 are a plurality of wear plates 64. Wear plates 64 provide a surface to support table 44 as well as reducing the friction and wear between table 44 and base assembly 12. Wear plates 64 are preferably manufactured from spring steel and protect base assembly 12 which is preferably manufactured from aluminum from excessive wear that would cause excessive play between base assembly 12 and table 44 leading to cutting inaccuracy.

Figure 7:
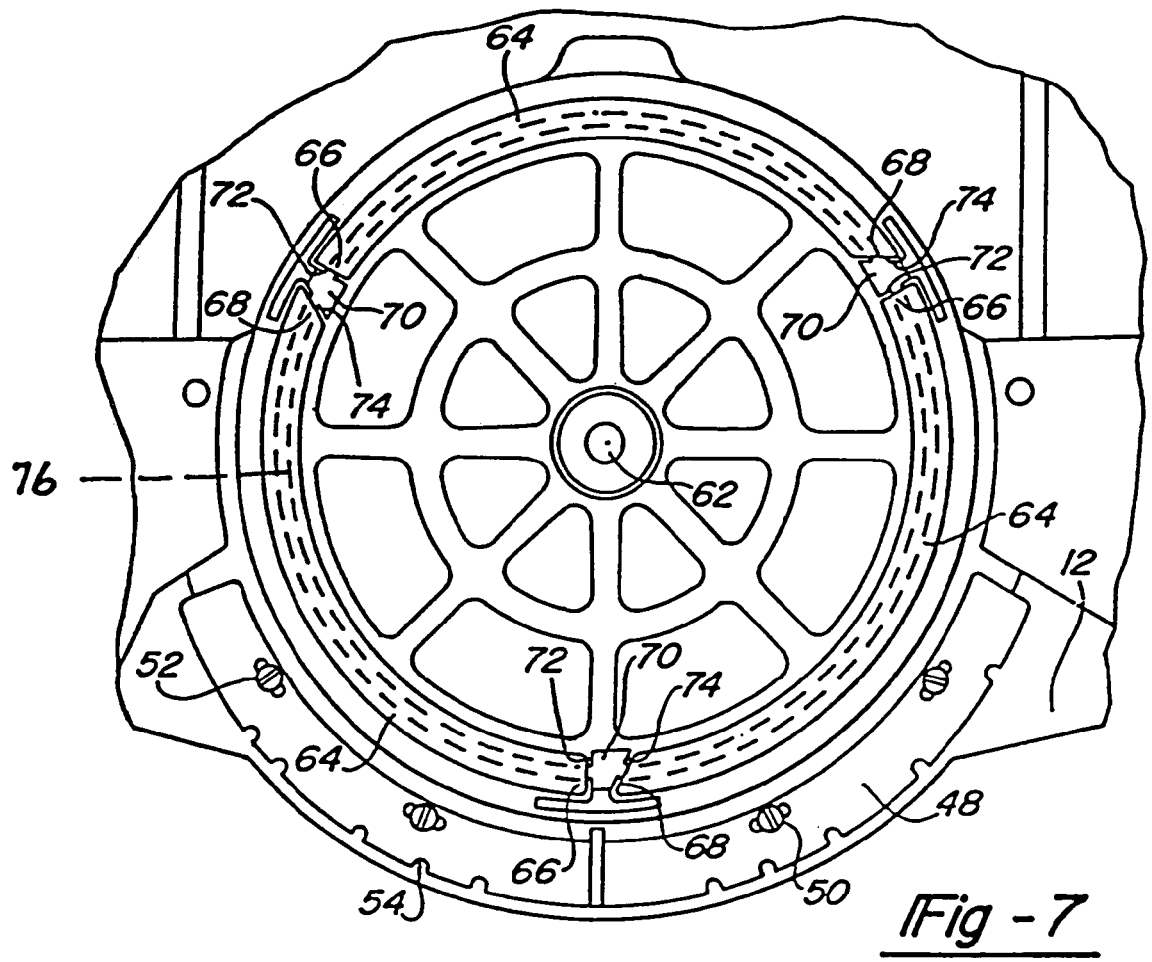
FIG. 7 is a plan view of the miter saw base illustrating the fool-proof assembly of the wear plates in accordance with the present invention.

Referring now to FIG. 7, wear plates 64 are preferably manufactured from pre-hardened steel using a stamping operation. This stamping of wear plates 64 forms a burred edge on one side of wear plates 64 which needs to be positioned against the stationary base 12 such that these burred edges do not interfere with the fit or rotation of table 44. In order to ensure proper orientation of wear plates 64, they are each provided with a first end 66 being cut along a radial line or perpendicular to a tangent line at that point and a second end 68 being cut at an acute angle to a radial line or an acute angle to a tangent line at that point. Base assembly 12 is provided with a plurality of formed shoulders 70 each of which defines a first surface 72 corresponding with first end 66 on plates 64 and a second surface 74 corresponding with second end 68 on plates 64. Surfaces 66, 68, 72 and 74 fool-proof the assembly of plates 64 to base assembly 12 by allowing only one orientation of each wear plate 64 with respect to base assembly 12 thus ensuring that any forming burr on wear plates 64 is positioned towards base assembly 12 and not towards table 44. Base assembly 12 includes a circumferentially extending ring 76 which is disposed between adjacent shoulders 70 to support and position wear plates 64.

Figure 6:
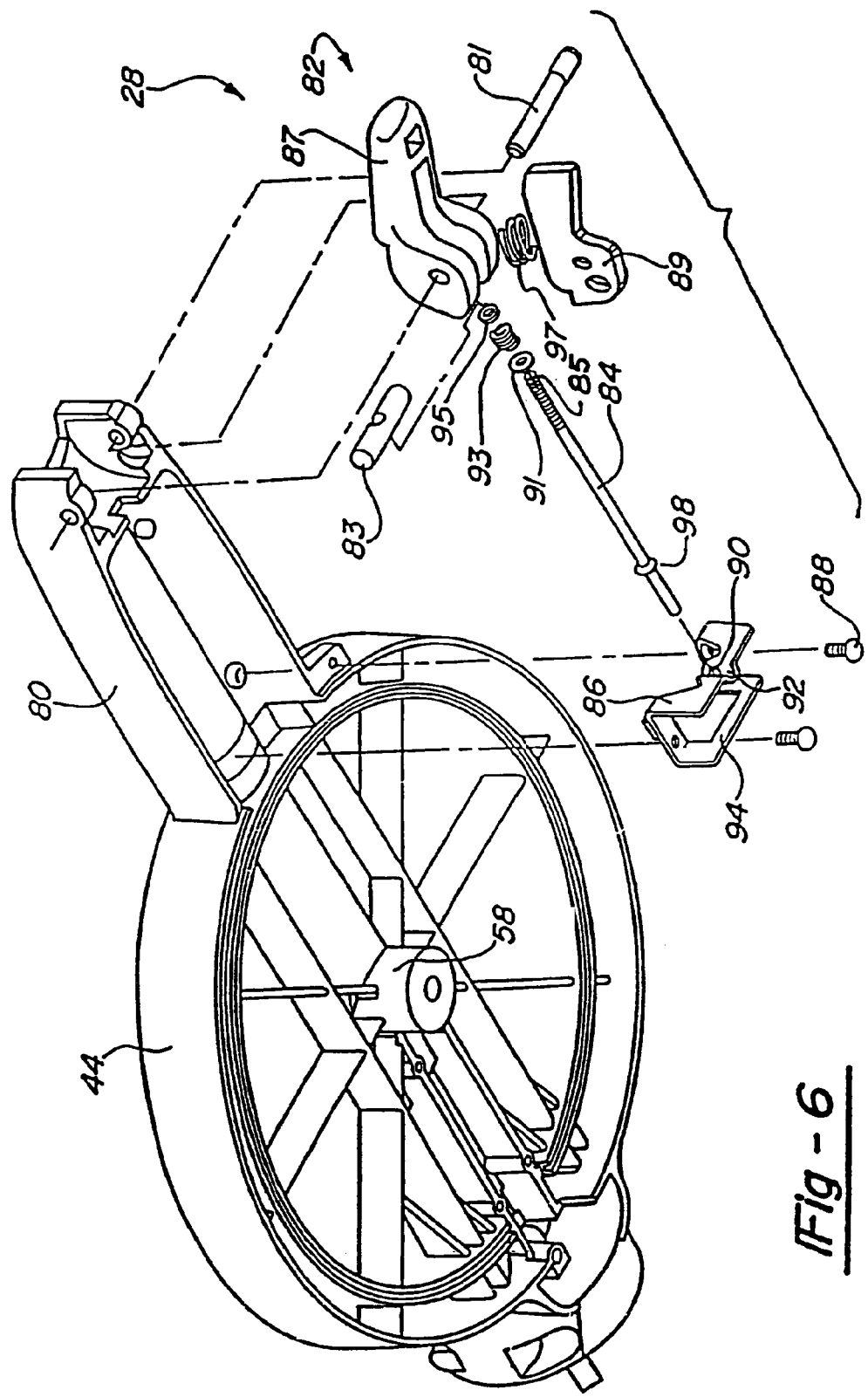
FIG. 6 is an exploded perspective view of the miter locking mechanism in accordance with the present invention.

Referring now to FIG. 6, locking mechanism 28 comprises a housing 80, a locking lever assembly 82, a threaded locking rod 84 and a locking spring 86. Housing 80 is a generally hollow rectangular member which is fixedly secured to table 44 such that it extends radially outward from table 44. Housing 80 is positioned on table 44 such that when saw blade 18 is positioned perpendicular to fence assembly 26, or a 0° miter angle, housing 80 is also generally perpendicular to fence assembly 26. Thus housing 80 is generally parallel to saw blade 18. Lever assembly 82 comprises locking lever 87 and detent trigger 89. Locking lever 87 and detent trigger 89 are pivotably secured to the outside end of housing 80 by a pin 81 and the threaded end of rod 84 is threadingly received in a pin 83 which is rotatably secured to detent trigger 89 with rod 84 extending from detent trigger 89 towards table 44. A coil spring 97 biases detent trigger 89 away from locking lever 87. Spring 86 is fixedly secured to table 44 by a pair of bolts 88 and defines an aperture 90 which slidingly accepts the opposite end of rod 84. Spring 86 is a generally U-shaped component with one leg of the U defining a spring detent 92 and the opposite leg of the U defining a locking tab 94. When spring 86 is assembled to table 44 and table 44 is assembled to base assembly 12, spring detent 92 is in biased engagement with detent plate 48 to define a detent system between table 44 and base assembly 12 and locking tab 94 is positioned adjacent to a cylindrical surface 96 located on base assembly 12. In order to increase the load with which spring detent 92 is in biased engagement with detent plate 48, a washer 91, a coil spring 93 and a retainer 95 are assembled to rod 84. Retainer 95 is fixedly secured to rod 84 and spring 93 reacts against washer 91 and thus spring detent 92 to increase the load with which spring detent 92 is biased into engagement with detent plate 48.

Figure 8A:
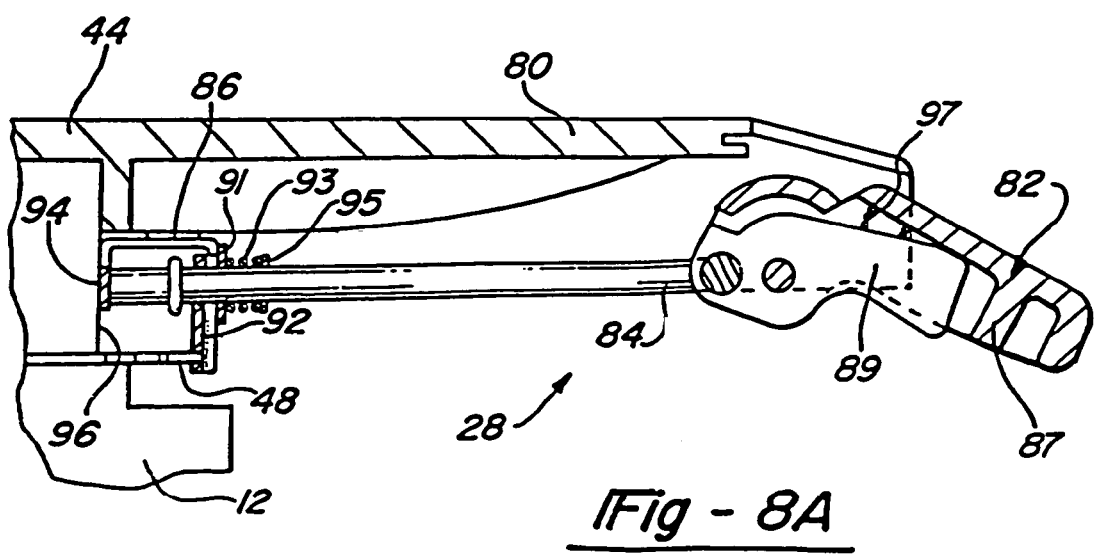
FIGS. 8A–8C are cross-sectional side views of the miter locking mechanism in accordance with the present invention showing the mechanism in its various positions.
Figure 8B:
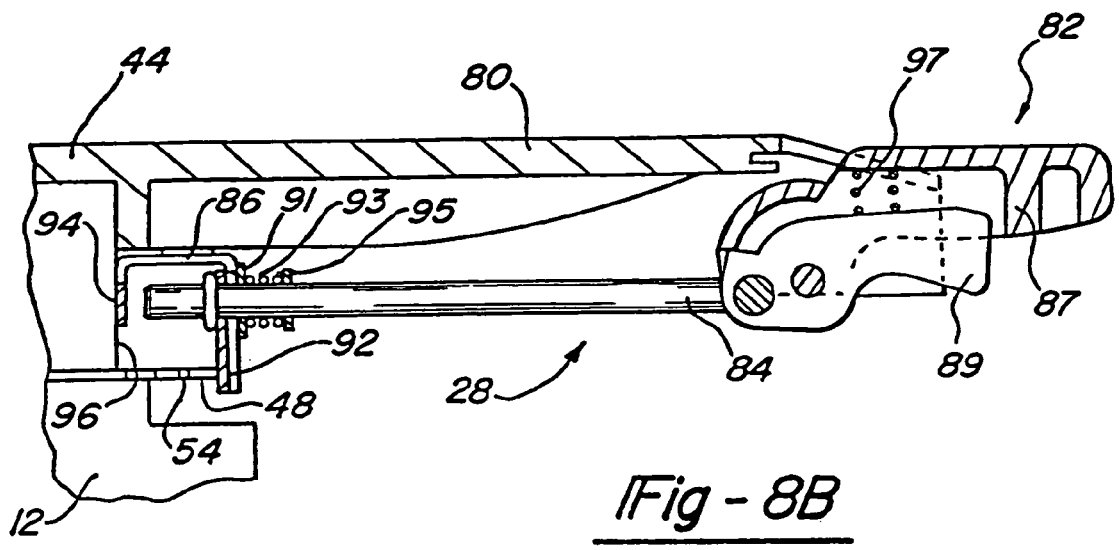
Figure 8C:
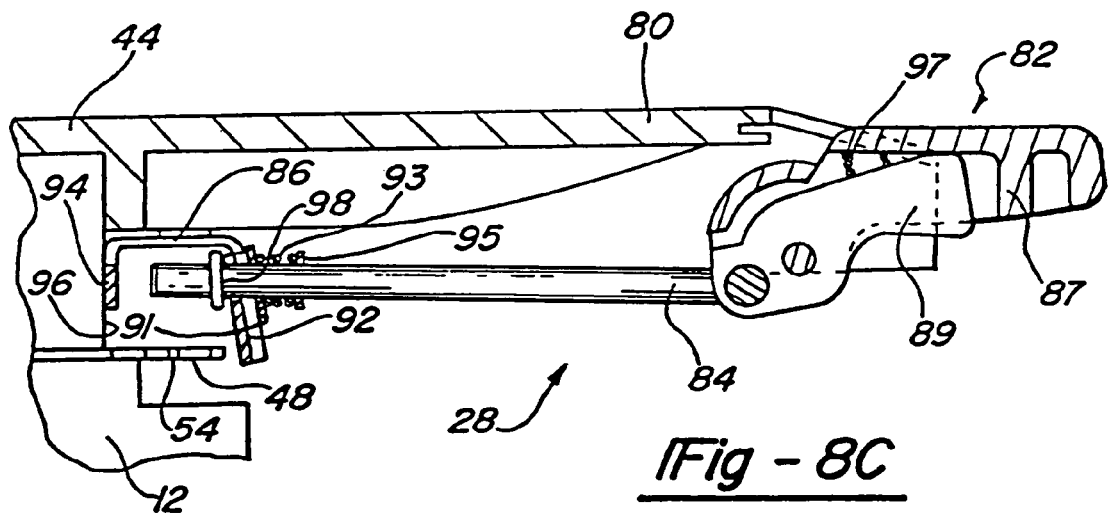

Locking mechanism 28 can be located in any one of three positions by the movement of lever assembly 82 as illustrated in FIGS. 8A–8C. Referring now to FIG. 8A, locking mechanism 28 is shown in its locked position with locking lever 87 of lever assembly 82 being located at a position approximately 30° down from a horizontal position. In this position, locking lever 87 urges detent trigger 89 downward which urges locking rod 84 towards table 44 which in turn engages locking tab 94 against surface 96 of base assembly 12 locking table 44 in position relative to base assembly 12 at the specific miter angle. The load with which locking rod 84 engages locking tab 94 and surface 96 can be adjusted by rotating locking rod 84 within pin 83 to adjust the working length of rod 84. A screw driver slot 85 is provided to facilitate this adjustment and a patch lock is incorporated onto the threads of locking rod 84 to retain locking rod 84 in its desired location with respect to pin 83.

Referring now to FIG. 8B, locking mechanism 28 is shown in its engaged position with locking lever 87 of lever assembly 82 being located at a generally horizontal position. In this position, detent trigger 89 is spaced from locking lever 87 and locking rod 84 is disengaged from locking tab 94. Table 44 can now be rotated with respect to base assembly 12. Spring detent 92 is in biased engagement with detent plate 48, thus rotation of table 44 with respect to base assembly 12 will cause spring detent 92 to ratchet between the plurality of detents 54 to releasably stop at the various popular miter angles for saw 10. As described above, in order to provide adjustability to saw 10, detent plate 48 is provided with slots 52 for securing plate 48 to base assembly 12 using bolts 50. With spring detent 92 being positioned in the "0°" detent, bolts 50 are loosened to allow table 44 to be positioned with respect to base assembly 12 such that saw blade 18 is perpendicular to fence assembly 26. When the relationship between saw blade 18 and fence assembly 26 has been set, bolts 50 are tightened, securing detent plate 48 and thus table 44 to base assembly 12 in the proper orientation. Movement of table 44 between detents 54 will then cause the accuracy of saw blade 18 in relation to fence assembly 26 to be dictated by the accuracy of the positioning of detents 54 in plate 48. Because the accuracy of detents 54 and plate 48 are controlled by a stamping operation, the positional relationship of detents 54 on plate 48 can be controlled to tight tolerances thus ensuring the accuracy of saw 10. While the above adjusting process has been described using the "0°" detent in plate 48, it is within the scope of the present invention to utilize any of the various detents 54 in plate 48 by checking the appropriate relationship between saw blade 18 and fence assembly 26 if desired.

Referring now to FIG. 8C, locking mechanism 28 is shown in its released position with locking lever 87 of lever assembly 82 being located at the generally horizontal position and detent trigger 89 also being moved to a generally horizontal position. In this position, an annular collar 98, fixedly secured to rod 84 contacts spring detent 92 and moves it radially outward or away from detents 54. With spring detent 92 being moved out of engagement with detents 54, the movement of table 44 with respect to base assembly 12 will occur without spring detent 92 ratcheting between detents 54. This position of locking mechanism 28 is especially useful when locating table 44 at a miter angle which is not pre-defined by one of detents 54 or when locating table 44 at a miter angle which is close to one of the pre-defined miter angles. When locating table 44 close to one of the pre-defined miter angles, the release of spring detent 92 eliminates the tendency of the system to jump into the adjacent detent thereby making it difficult to set a miter angle close to but not exactly equal to one of the pre-defined miter angles.

While the above detailed description describes the preferred embodiment of the present invention, it should be understood that the present invention is susceptible to modification, variation and alteration without deviating from the scope and fair meaning of the subjoined claims.

What is claimed is:

1. A device for performing operations on a workpiece, the device comprising:
   a base;
   a table rotatably secured to the base;
   a lever assembly pivotably secured to the table;
   a locking spring secured to the table;
   a locking rod extending between the lever assembly and the locking spring, the lever assembly moving the locking rod between a first position where an end of the locking rod urges the locking spring into engagement with the base to lock the table to the base, a second position where the end of the locking rod releases the locking spring so that the locking spring releasably holds the table to the base, and a third position where the locking rod moves the locking spring to disengage the base to allow rotation of the table with respect to the base.

2. The device according to claim 1, wherein the lever assembly comprises a first lever pivotably secured to the table and a second lever pivotably secured to the table.

3. The device according to claim 2, wherein the first lever and the second lever are pivotably secured to the table along a common pivot axis.

4. The device according to claim 1, the base comprising a detent plate, the detent plate defining at least one detent, the locking spring engaging the detent when the locking spring is in the second position.

5. The device according to claim 1, wherein the locking spring comprises a generally U-shaped body having first and second legs.

6. The device according to claim 5, wherein the first leg of the locking spring engages the base in the first position.

7. The device according to claim 6, wherein the second leg of the locking spring engages the base in the second position.

8. The device according to claim 5, wherein the second leg of the locking spring engages the base in the second position.

9. The device according to claim 5, wherein the locking rod extends through the second leg of the locking spring.

10. The device according to claim 9, wherein the locking rod urges the first leg of the locking spring into engagement with the base in the first position.

11. The device according to claim 10, wherein the locking rod moves the second leg of the locking spring out of engagement with the base in the third position.

12. The device according to claim 9, wherein the locking rod moves the second leg of the locking spring out of engagement with the base in the third position.

13. The device according to claim 1, wherein the lever assembly comprises a first lever pivotably secured to the table and a second lever pivotably secured to the table, the second lever being disposed within a slot defined by the first lever.

14. The device according to claim 13, wherein the first lever and the second lever are pivotably secured to the table along a common pivot axis.

15. The device according to claim 1, further comprising:
a wear plate disposed between the base and the table;
means for orientating the wear plate with respect to the base.

16. The device according to claim 15, wherein the wear plate has a first face and an oppositely disposed second face, the orientating means locating the first face towards the table.

* * * * *